US009889897B2

(12) United States Patent
Cabello Soro et al.

(10) Patent No.: US 9,889,897 B2
(45) Date of Patent: Feb. 13, 2018

(54) BICYCLE COMPRISING AN ANTI-THEFT SECURITY SYSTEM

(71) Applicants: Cristóbal Fernando Cabello Soro, Santiago (CL); Juan José Monsalve San Martín, Santiago (CL); Andrés Ignacio Roi Eggers, Santiago (CL)

(72) Inventors: Cristóbal Fernando Cabello Soro, Santiago (CL); Juan José Monsalve San Martín, Santiago (CL); Andrés Ignacio Roi Eggers, Santiago (CL)

(73) Assignee: YERKA CHILE SPA, Santiago (CL)

( * ) Notice: Subject to any disclaimer, the term of this patent is extended or adjusted under 35 U.S.C. 154(b) by 0 days.

(21) Appl. No.: 15/103,351

(22) PCT Filed: May 22, 2015

(86) PCT No.: PCT/CL2015/050015
§ 371 (c)(1),
(2) Date: Jun. 10, 2016

(87) PCT Pub. No.: WO2015/179994
PCT Pub. Date: Dec. 3, 2015

(65) Prior Publication Data
US 2016/0311484 A1 Oct. 27, 2016

Related U.S. Application Data

(60) Provisional application No. 62/005,874, filed on May 30, 2014.

(51) Int. Cl.
B62H 5/00 (2006.01)
B62H 5/08 (2006.01)
(Continued)

(52) U.S. Cl.
CPC ............... B62H 5/00 (2013.01); B62H 5/08 (2013.01); B62K 3/02 (2013.01); B62K 19/30 (2013.01)

(58) Field of Classification Search
CPC .................................. B62H 5/00; B62H 5/08
See application file for complete search history.

(56) References Cited

U.S. PATENT DOCUMENTS 3,814,462 A    6/1974  Kelly
3,908,414 A *  9/1975  Thorne ................. B62H 5/003
                                                70/18
(Continued)

FOREIGN PATENT DOCUMENTS

CN        2252151 Y      4/1997
CN      202080368 U     12/2011
(Continued)

OTHER PUBLICATIONS

PCT International Search Report dated Sep. 15, 2015 for Intl. App. No. PCT/CL2015/050015, from which the instant application is based, 3 pgs.

Primary Examiner — Jacob D Knutson
Assistant Examiner — Michael R Stabley
(74) Attorney, Agent, or Firm — Fredrikson & Byron, P.A.

(57) ABSTRACT

The invention relates to a human powered vehicle with a built-in security system, preferably a bicycle, comprising a frame including a lower tube and a seat tube, said lower tube preferably being formed by two segments. A first part of a lock device is inserted into the lower end of the seat tube. The first segment of the lower tube is connected at one end to a telescopic tube by means of a pivot pin, while the other end of said segment includes a hole having the same diameter as that of the seat tube. The second segment of the lower tube is connected at one end to the bicycle drive (Continued)

system by means of a pivot pin, while the other end of said segment includes a hole into which a second part of the lock device is inserted.

18 Claims, 11 Drawing Sheets

(51) Int. Cl.
*B62K 3/02* (2006.01)
*B62K 19/30* (2006.01)

(56) References Cited

U.S. PATENT DOCUMENTS

| | | | | |
|---|---|---|---|---|
| 4,252,335 A * | 2/1981 | Brenner | ............... | B62K 15/00 |
| | | | | 280/278 |
| 4,417,745 A * | 11/1983 | Shomo | ............... | B62K 15/006 |
| | | | | 280/287 |
| 4,986,095 A * | 1/1991 | Chou | ............... | E05L 367/006 |
| | | | | 70/10 |
| 5,149,119 A | 9/1992 | Hwang | | |
| 5,156,031 A * | 10/1992 | Gaul | ............... | B62H 5/001 |
| | | | | 224/935 |
| 5,325,689 A * | 7/1994 | Warner | ............... | B62H 5/003 |
| | | | | 70/18 |
| 5,558,349 A | 9/1996 | Rubin | | |
| 5,678,435 A | 10/1997 | Hodson | | |
| 5,832,753 A * | 11/1998 | Nielsen | ............... | B62H 5/00 |
| | | | | 224/425 |
| 6,135,478 A * | 10/2000 | Montague | ............... | B62K 15/00 |
| | | | | 280/278 |
| 6,503,019 B1 * | 1/2003 | Wang | ............... | B62J 99/00 |
| | | | | 224/501 |
| 6,751,992 B1 * | 6/2004 | Esquilin | ............... | B62H 3/02 |
| | | | | 70/227 |
| 6,820,448 B1 * | 11/2004 | Hsieh | ............... | E05L 367/003 |
| | | | | 70/18 |
| 6,948,731 B2 * | 9/2005 | Noer | ............... | B62H 5/00 |
| | | | | 280/279 |
| 8,939,000 B2 * | 1/2015 | Mendyk | ............... | B62H 5/006 |
| | | | | 297/195.1 |
| 9,168,968 B2 * | 10/2015 | Pomerantz | ............... | B60R 9/10 |
| 2003/0074933 A1 | 4/2003 | St. Amand | | |

FOREIGN PATENT DOCUMENTS

| | | |
|---|---|---|
| CN | 102454321 A | 5/2012 |
| CN | 202624447 U | 12/2012 |
| DE | 4229236 A1 | 3/1994 |
| WO | 03026948 A1 | 4/2003 |

* cited by examiner

BICYCLE COMPRISING AN ANTI-THEFT SECURITY SYSTEM

RELATED APPLICATIONS

This application is a 35 U.S.C. 371 national stage filing from International Application No. PCT/CL2015/050015, filed May 22, 2015, which claims priority to U.S. Provisional Application No. 62/005,874, filed May 30, 2014, the teachings of which are incorporated herein by reference.

SCOPE

The present invention relates to a human-powered vehicle, particularly a bicycle, comprising an integrated security system to ensure that vehicle to a specific location, reducing the risk of being stolen.

DESCRIPTION OF PRIOR ART

There are several systems at present integrated to human-powered vehicles for their locking and security. These systems allow to reconfigure the frame of a bicycle for providing a new structure that can be secured to an external element such as poles or trees.

Document CN 202080368 (U) by Bowen Zheng discloses an anti-theft structure of a bicycle comprising a sprocket chain device, a keyhole, a plastic barrier block, a chain locking cover, and a chain positioning aluminum tube. A top tube part of the bicycle is additionally provided with a penetrating tube element, wherein the chain is positioned in the aluminum tube, together with a top tube and a down tube.

The utility model CN 2252151 (U) by Peng Zhongwei discloses an anti-theft bicycle frame, wherein the lower end of a first and second inclined rod are respectively connected with a shaft sleeve of the pedal. The second inclined rod is formed by the connection of a lower section and an upper section. A fixing base is connected with a sleeve barrel at the front. A centre pole is connected with the upper part of the first inclined rod or a fixing base on the lower part and can swing and rotate, and locking therefore the bicycle wheel.

The Chinese Patent Application CN 102454321 (A) discloses a multi-bike lock, comprising: a first hinge and a second hinge arranged on the handlebar of the bicycle. The handlebar may be curved in areas where the hinges are and connects to a cross bar of a triangular bicycle frame after bent along the first hinge, forming a first lock. Also, the handlebar is connected to a slash triangular bicycle frame after bent along the first hinge, forming a second lock.

Document DE 4229236 (A1) by Koss Siegfried discloses a bicycle lock system on the saddle bar of said bicycle. With the bicycle secured, the saddle bar is drawn outwards in relation to its normal position. The lock incorporates a mechanism which guarantees an immovable locking with the saddle bar. The saddle bar is fitted in a bearing casing which is arranged within the bicycle frame. The bearing casing consists of slidable material or at least the inside of the bearing casing is coated with such material.

The Chinese utility model CN 202624447 (U) by Cheng Tao discloses a bicycle lock, comprising a cross beam bicycle that can be bent and is connected with the bicycle through a threaded lock latch. The cross beam is detachable and is connected with the handlebar through a threaded lock latch installed on the handlebar. The handlebar and cross beam are connected mutually to form the bicycle lock.

The international application WO03026948 (A1), on behalf of Noer Ole Martin, discloses a theft-proof bicycle comprising a frame structure consisting of three frame parts, which are connected so as to form a triangular structure. The rod for the front wheel's supporting fork is attached to the triangle's front corner, while the rear wheel's supporting fork structures are attached to the frame structure in the areas of the two other corners. One of the frame parts forming the triangle's front corner is designed with a holding sleeve for the rod for the front wheel's supporting fork. The sleeve is equipped with an extension and an aperture for passing through a locking pin. The second frame part in the area of this corner is designed as a fork, one prong of which is passed on each side of the front wheel fork's rod. The supporting frame is equipped in a corner with a pivot connection in order to permit a relative movement of the supporting parts in the supporting frame's plane, between an operating or cycling position and a locked position.

Even though all systems described above allow securing a bicycle somewhere, they require much intervention from the user, and are not simple or fast when implemented. In particular, these systems are limited to securing the bicycle in relatively thin elements such as poles and trees.

Technical Problem

According to what is disclosed in the prior art, there is a need for a security or anti-theft system for human-powered vehicles, preferably applied to bicycles, being easy to use and implement, and allowing the bicycle to be disable in the event of a theft. Furthermore, there is a need for a security system protecting the main components of a human-powered vehicle, such as the seat post and the seat itself, and that said protection may be applicable to a wide range of places to quickly and easily secure said human-powered vehicle without involving much time in securing it.

SUMMARY OF THE INVENTION

The present invention relates to a security or lock system applied to the bicycle frame allowing it to be secured at different locations, provided they are compatible with said lock (e.g. poles, trees, fences, bike racks, etc.), using the frame as a lock.

The invention consists in a bicycle, wherein the down tube of the frame of said bicycle and the seat post are combined in order to form a lock system. The down tube is divided into two sections: one section is attached to one end to the steerer tube or head tube through a pivot, while having a hole with the diameter of the seat post at the other end. Moreover, the other section of the down tube is attached at one end to the engine through a pivot and its other end has part of the part forming the lock, which consist in turn in two parts. Both sections are coupled together by a locking, thereby completing the down tube of the bicycle.

The second part of the lock is added to the seat post at the lower end. In order to form the lock the locking should be unlocked for opening the down tube of the bicycle frame through its two sections. The seat post is then removed from the frame. The seat post is inserted into the hole at the upper-section end of the down tube of the frame.

Finally, the lock part is completed when the lower end of the seat post is attached to the lower-section end of the down tube of the frame (completing the lock).

According to the proposed configuration, a bicycle with a security system that is easy to use and implement, and that allows the bicycle to be secured at a lot of locations (such as poles, trees, fences, bike racks, etc.) compatible with said lock is achieved. In addition, when this type of lock is broken due to theft it does not allow the bicycle to be used, which prevents further uses. On the other hand, it is a simple and quick security system.

DETAILED DESCRIPTION OF THE INVENTION

Figure 1:
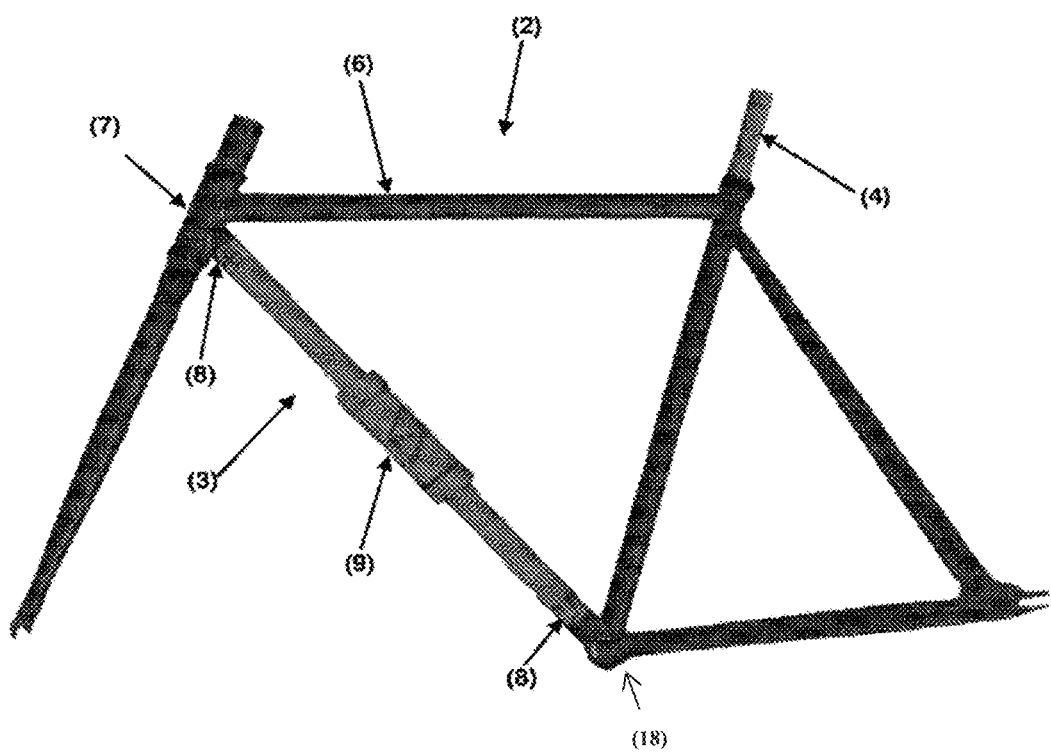
FIG. 1 shows a bicycle frame according to one embodiment of the invention.
Figure 2:
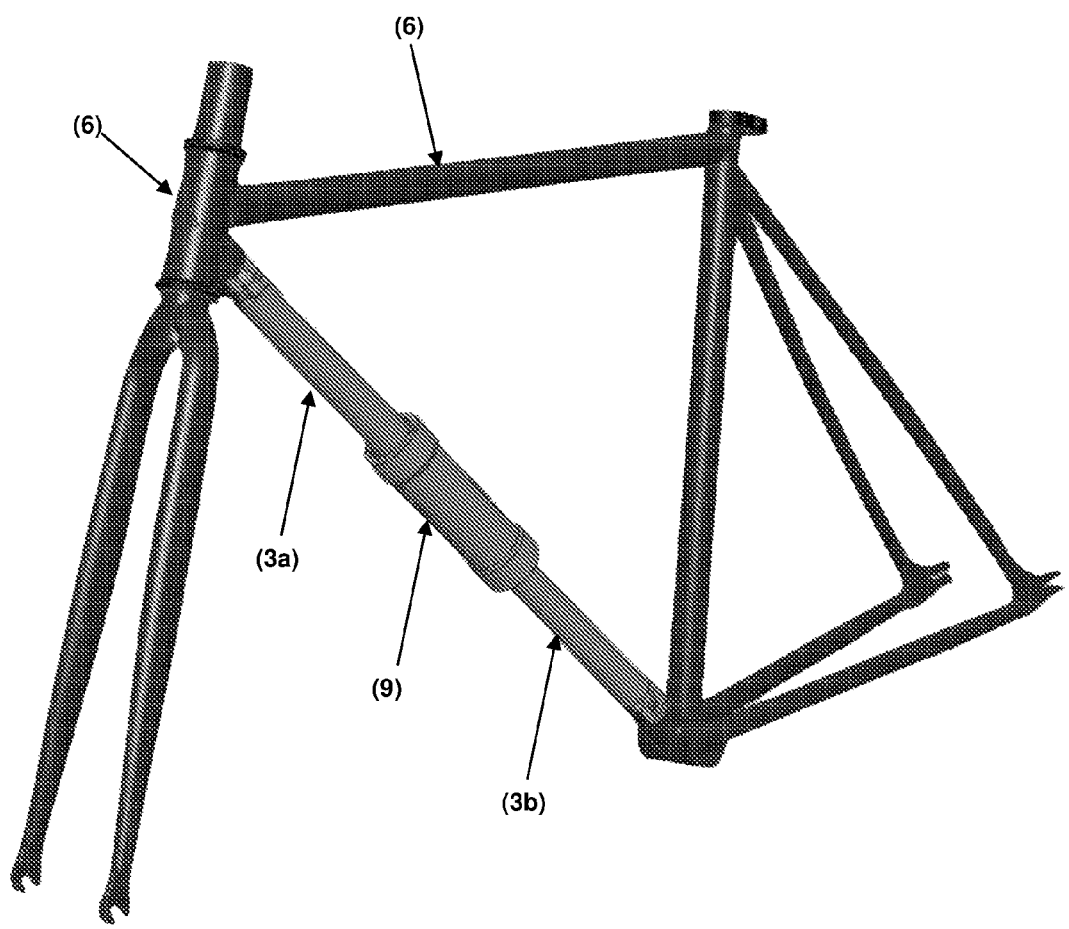
FIG. 2 shows a perspective view of a bicycle frame with two sections of the down tube according to one embodiment of the invention.
Figure 3:
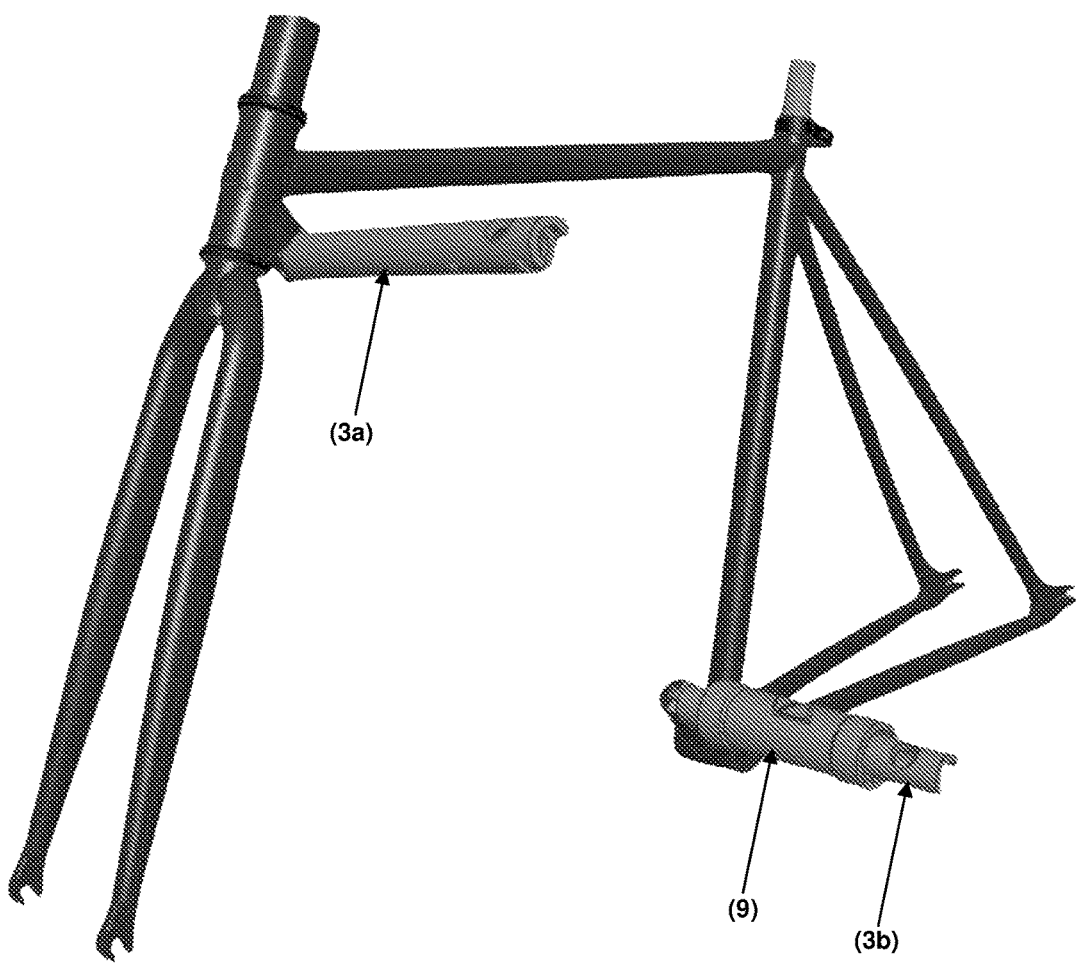
FIG. 3 shows a perspective view of a bicycle frame with two separated sections of the down tube according to one embodiment of the invention.
Figure 4:
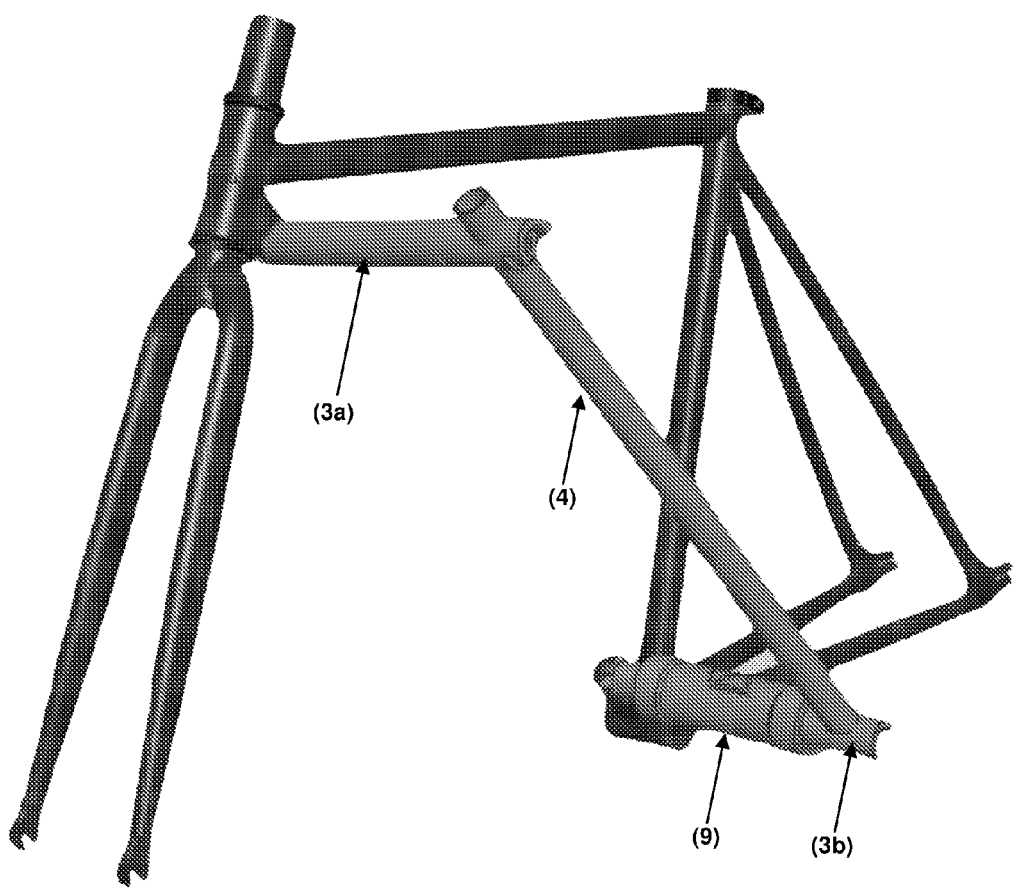
FIG. 4 shows a bicycle frame with its lock configuration according to one embodiment of the invention.

The present invention relates to a security system for human-powered vehicles. In a preferred embodiment of the present invention, the security system for human-powered vehicles is particularly applied to a bicycle (1). As shown in FIGS. 1 and 2, the invention comprises a frame (2) of a bicycle (1) with said security system, which allows it to be secured at different locations (e.g., poles, trees, fences, etc. compatible with said lock), using the same frame (2) of the bicycle (1) as a lock. The invention comprises a down tube (3) of the frame (2), which is configured preferably in two sections (3a, 3b) and a seat post (4) of said bicycle (1), which are combined so as to configure the lock for securing the bicycle (1), as shown in FIGS. 3 and 4.

Figure 6:
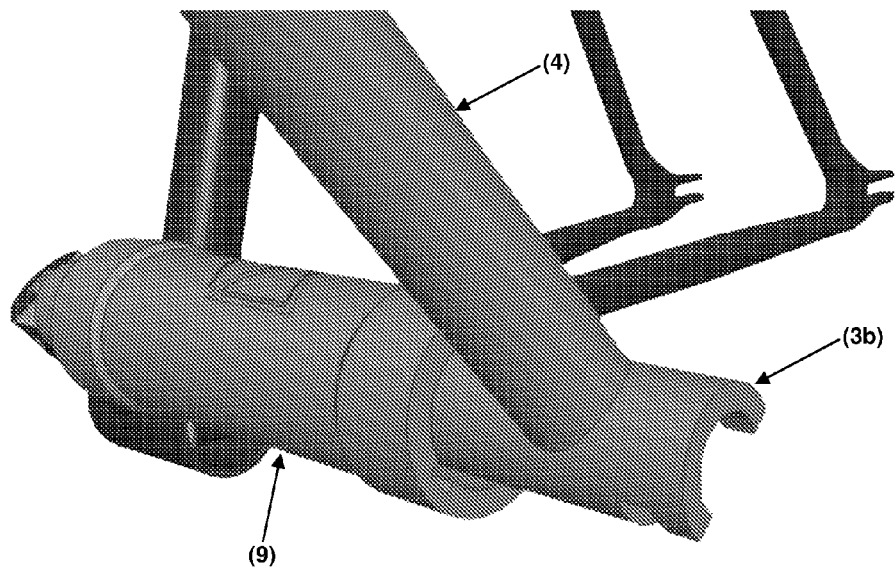
FIG. 6 shows the locking system according to one embodiment of the invention.
Figure 7:
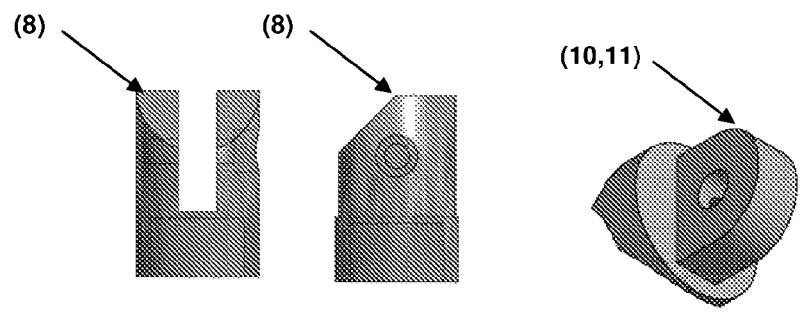
FIG. 7 shows the pivot parts and the extended portions according to one embodiment of the invention.
Figure 8A:
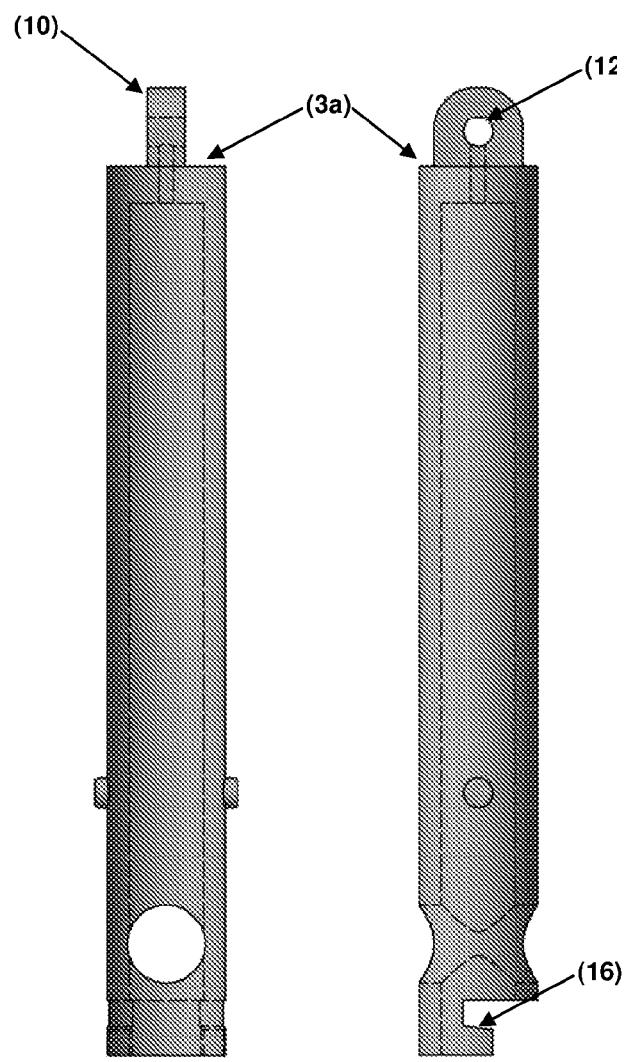
FIG. 8a shows the first attachment section according to one embodiment of the invention.
Figure 8B:
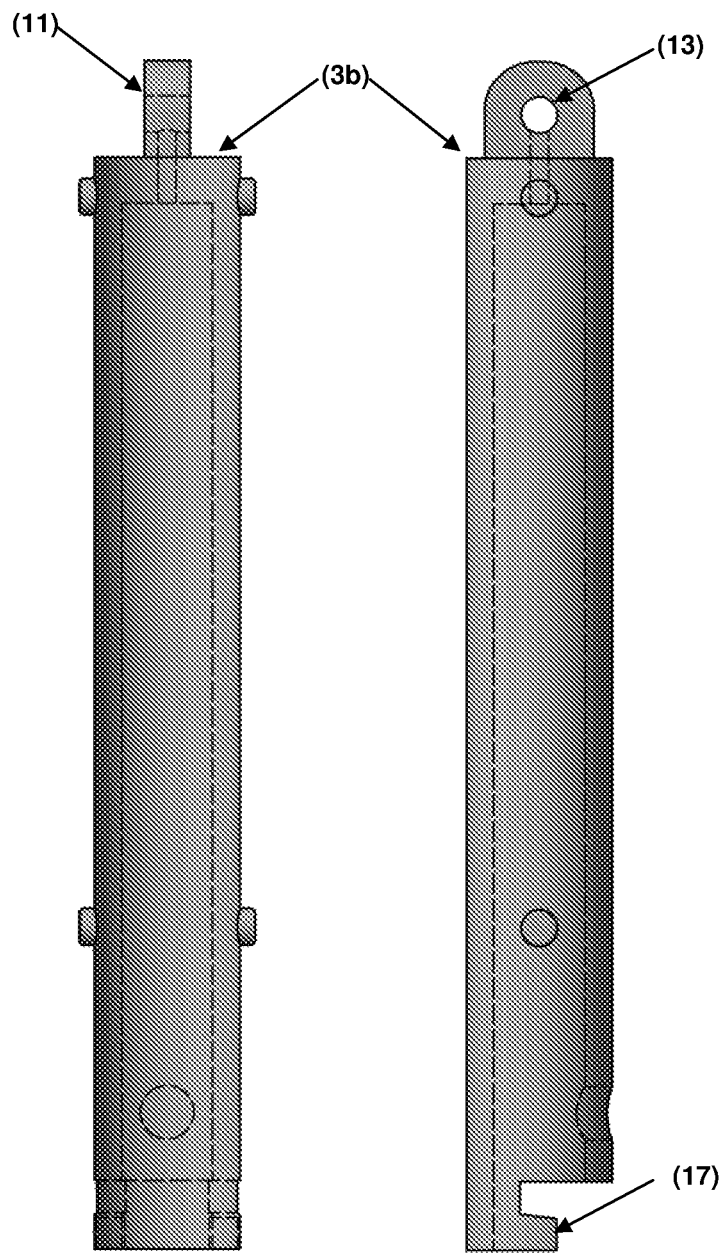
FIG. 8b shows the second attachment section according to one embodiment of the invention.
Figure 10:
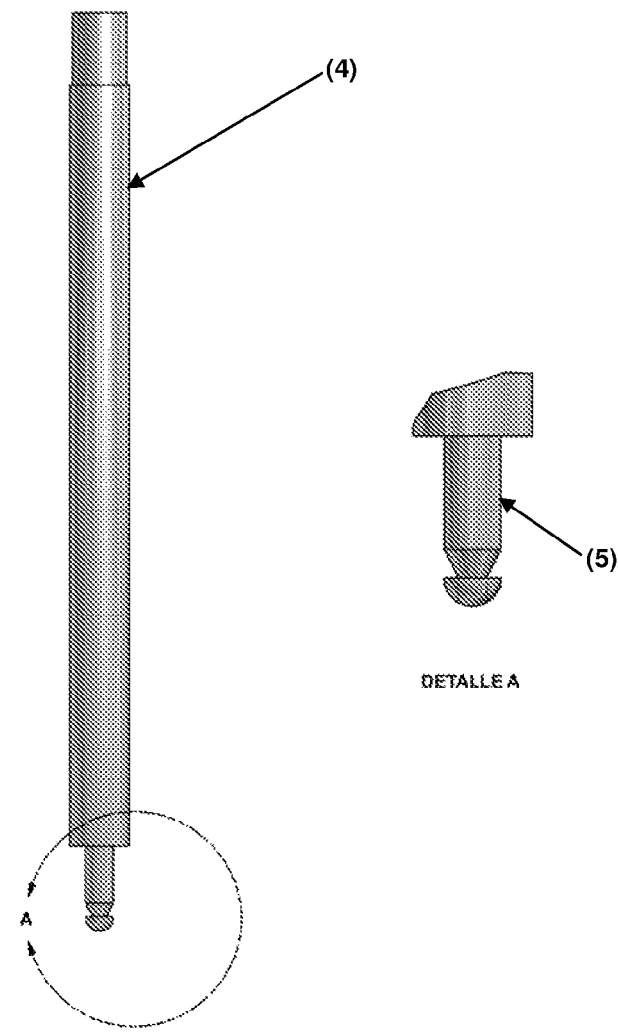
FIG. 10 shows the seat post according to one embodiment of the invention.
Figure 11:
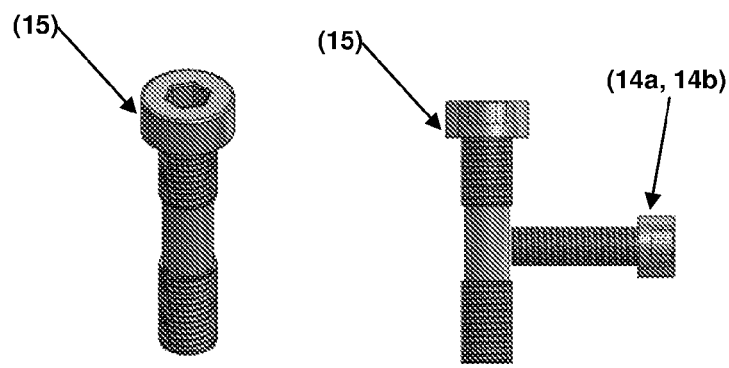
FIG. 11 shows the socket screw and the socket screw head according to one embodiment of the invention.
Figure 12:
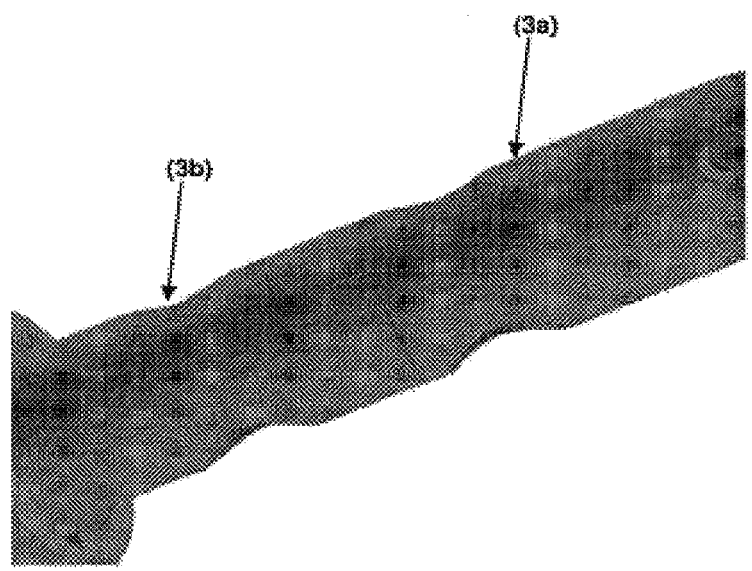
FIG. 12 shows the detail of the attachment of the two sections according to one embodiment of the invention.
Figure 13:
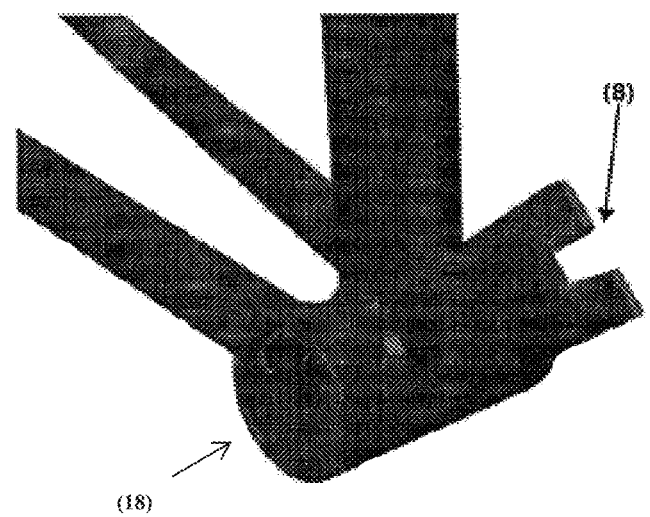
FIG. 13 shows the pivot part at the bottom of the frame according to one embodiment of the invention.
Figure 14:
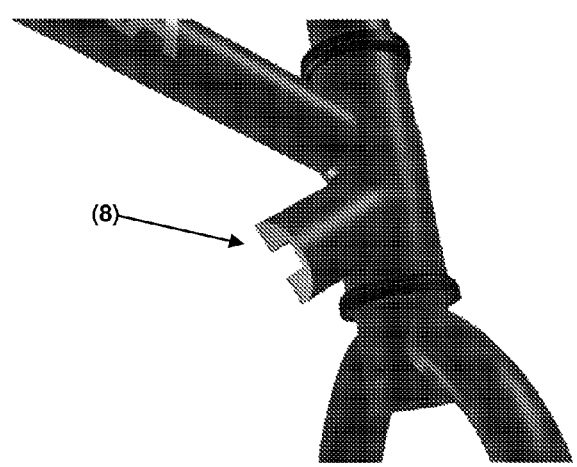
FIG. 14 shows the pivot part at the upper of the frame according to one embodiment of the invention.
Figure 15:
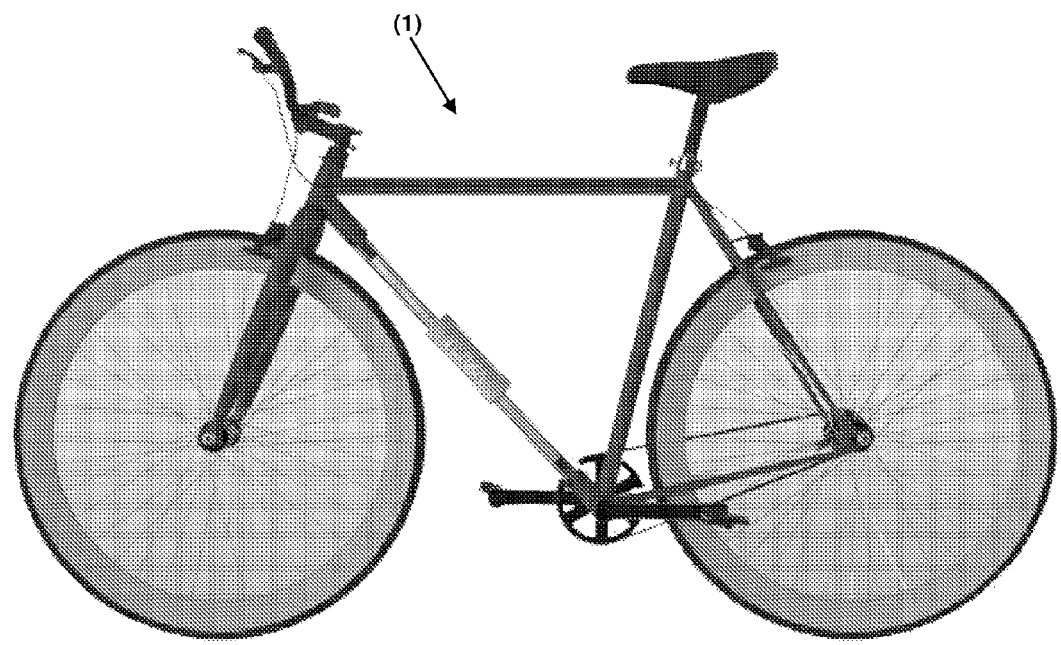
FIG. 15 shows the human-powered vehicle according to one embodiment of the invention.

In order to achieve the lock configuration, both the seat post (4) and the down tube (3) have changes compared with their conventional bicycle counterparts. Two parts in order to form the lock are needed, one with the seat post (4) and the other in the second section (3b) of the down tube (3) of the bicycle (1). Thus, a locking device (5) attached to one end of the seat post (4) is provided, and corresponds to a protruding portion for engaging the locking, as shown in FIGS. 6 and 7. FIG. 10 shows a detail of the seat post (4) with the locking device (5). This lock can be mechanically controlled with a lock, or through wireless communication systems such as Wi-Fi, Bluetooth or the like.

The frame (2) of the bicycle comprises a horizontal top tube (6) and a head tube (7). The head tube (7) is vertically located with a slight inclination to the horizontal top tube (6). The horizontal top tube (6) and the down tube (3) are attached to said head tube (7). The head tube (7) is not movable or pivotable. The first section (3a) of the down tube (3), which is the closest section to the head tube (7), is attached at one end to said head tube (7) through a pivot, while having a hole adjacent to its other end with the diameter of the seat post. The first section (3a) comprises an extended portion (10) having a preferably threaded bore (12) attached to the head tube (7) for configuring the pivot connection, wherein a socket screw (14a) is inserted into said bore (12) through a fastening mean (15) comprising an unthreaded portion at its center, which comes into contact with the socket screw (14a). At the other end, the first section (3a) comprises a quarter extension (16) of the first section (3a), which in turn has a cut at a distance from its end that is used as an engagement for attaching the second section (3b).

Figure 5:
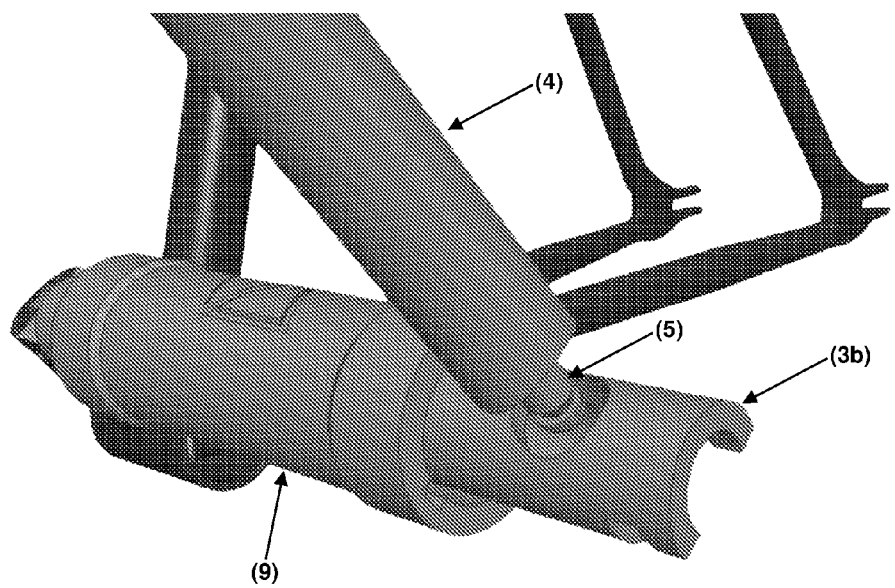
FIG. 5 shows the locking parts mounted on the bicycle frame according to one embodiment of the invention.

The second section (3b) of the down tube (3) is attached at one end to the drive system of the bicycle by a pivot, and has a hole adjacent to the other end wherein the locking device (5) is inserted (see FIGS. 5 and 6). The second section (3b) comprises an extended portion (11) having a preferably threaded bore (13) attached to the lower part (18) of the frame (2) for configuring the pivot connection, wherein a second socket screw (14b) is inserted into said bore (13) through a fastening mean (15) comprising an unthreaded portion at its center, which comes into contact with the socket screw (14b). At the other end, the second section (3b) comprises a quarter extension (17) of the second section (3b), which in turn has a cut at a distance from its end that is used as an engagement for attaching the first section (3a).

The socket screws (14a, 14b) preferably correspond to a threaded bolt inserted through the respective threaded bores (12, 13), and intersecting the respective fastening mean (15) at its unthreaded section. The contact in this area prevents said fastening mean (15) to be removed, since the respective socket screws (14a, 14b) are in contact with the unthreaded section having a smaller diameter than the thread, and, consequently, when said fastening mean (15) is trying to be removed, the respective socket screw (14a, 14b) applies force on its threaded section (row) preventing its removal.

There is a pivot part (8) where both the first section (3a) and the second section (3b) turn with respect to the frame (2) of the bicycle (1), as shown in FIG. 7. Each pivot part (8) is inserted into the frame (2) of the bicycle (1) to fit with the extended portions (10, 11) of the sections (3a, 3b).

Figure 9:
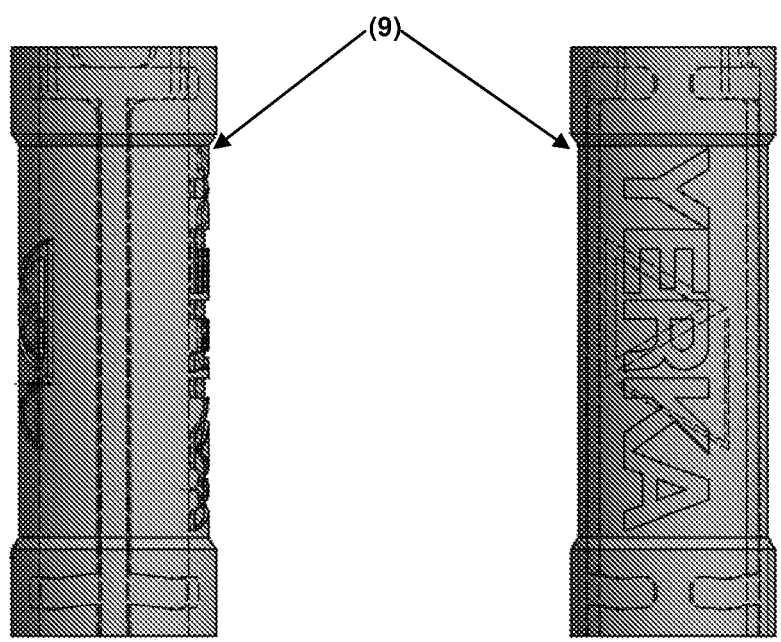
FIG. 9 shows the attachment outer tube according to one embodiment of the invention.

When the bicycle (1) is in operation, the sections (3a, 3b) of the down tube (3) (separately shown in FIG. 9) are attached by a fastening outer tube (9) (as shown in FIG. 10), and keep the structural unit of the frame (2). The fastening outer tube (9) preferably consist in a solid metal part with inner channels, which are used to guide the attachment extensions (16, 17) of the sections (3a, 3b), said extensions (16, 17) being complementary and attached together. Such structural lock forms part of the bicycle (1), granting a tensile strength against the traction generated by the forces applied during the use of the bicycle (1) to the lower entire structural unit consisting of the first section (3a), the second section (3b), and the fastening outer tube (9). The inner channels of the fastening outer tube (9) are used to apply pressure to said extensions (16, 17), increasing thereby the strength of the sections (3a, 3b) when the removal of the locking is not required due to any movement.

In order to form the lock, the fastening outer tube (9) must be unlocked and moved towards one of the sections of the down tube (3) for separating the down tube (3) at its two sections (3a, 3b). Subsequently, the seat post (4) of the frame (2) of the bicycle is removed. Then, the bicycle is placed in a location in order to be secured (trees, poles, fences, bike racks, etc.). The seat post (4) is inserted into the hole of the first-section end (3a) of the down tube (3) of the frame (2). Finally, the lock of the bicycle is completed by attaching the lower end of the seat post (4), where the locking device (5) is, and where the fastening outer tube (9) is inserted with the end of the lower section (3b) of the down tube of the frame (2) completing the lock.

The invention claimed is:

1. Bicycle with an integrated security system, comprising a frame that in turn comprises a down tube and a seat post of said bicycle, wherein the down tube is configured in first and second sections, wherein a locking device is at a lower end of the seat post, and the first section of the down tube is attached at one end to a head tube through a pivot, while the other end of the first section of the down tube has a hole with a diameter of the seat post so as to permit a portion of the seat post to extend therethrough, and wherein the second section of the down tube is attached at one end to a lower frame part of the bicycle through another pivot and the other end of the second section of the down tube has a hole in which the locking device is inserted.

2. Bicycle with an integrated security system according to claim 1, characterized in that both the first and second sections are attached together through a lock, completing thereby the down tube.

3. Bicycle with an integrated security system according to claim 1, characterized in that a pivot part is provided by which both the first section and the second section turn with respect to the frame.

4. Bicycle with an integrated security system according to claim 3, characterized in that a first part of the pivot part is inserted into both first and second sections of the down tube, while a second part of the pivot part is inserted into the frame.

5. Bicycle with an integrated security system according to claim 2, characterized in that the first section comprises an extended portion with a threaded bore attached to the head tube for configuring the pivot.

6. Bicycle with an integrated security system according to claim 5, characterized in that a socket screw is inserted into said threaded bore with a fastening mean comprising an unthreaded portion at a center of the fastening mean, which comes into contact with the socket screw.

7. Bicycle with an integrated security system according to claim 1, characterized in that at the other end, the first section comprises a quarter extension of the first section having a cut at a distance from the other end for the attaching connection with the second section.

8. Bicycle with an integrated security system according to claim 1, characterized in that the second section comprises an extended portion with a threaded bore attached to the down tube of the frame for configuring the another pivot.

9. Bicycle with an integrated security system according to claim 8, characterized in that a second socket screw is inserted into said threaded bore with a fastening mean comprising an unthreaded portion at a center of the fastening mean, which comes into contact with the socket screw.

10. Bicycle with an integrated security system according to claim 8, characterized in that at the other end, the second section comprises a quarter extension of the second section, which in turn has a cut at a distance from the other end that is used as an engagement for attaching the first section.

11. Integrated security system for a bicycle, comprising a frame, the system comprising a first tube for forming a down tube of the bicycle frame and a second tube forming a seat post for the bicycle and comprising a locking device at a lower end of the seat post, the first tube comprising first and second separable sections, the first section at one end configured to attach to a head tube of the bicycle frame through a pivot, while the other end of the first section has a hole with a diameter of the second tube so as to permit a portion of the second tube to extend therethrough, the second section of the first tube at one end configured to attach to a lower part of the bicycle frame through another pivot, while the other end of the second section has a hole in which the locking device of the second tube is insertable.

12. Integrated security system for a bicycle according to claim 11, wherein both the first and second sections are configured to be attached together through a lock so as to form the down tube for the bicycle.

13. Integrated security system for a bicycle according to claim 12, characterized in that the first section comprises an extended portion with a threaded bore configured for being attached to the head tube for configuring the pivot.

14. Integrated security system for a bicycle according to claim 11, characterized in that a pivot part is provided by which both the first section and the second section are configured to turn with respect to the head tube and lower frame parts.

15. Integrated security system for a bicycle according to claim 14, characterized in that at the other end, the first section comprises a quarter extension of the first section having a cut at a distance from the other end for the attaching connection with the second section.

16. Integrated security system for a bicycle according to claim 11, characterized in that the second section comprises an extended portion with a threaded bore configured for being attached to the lower frame part for configuring the another pivot.

17. Integrated security system for a bicycle according to claim 16, characterized in that at the other end, the second section comprises a quarter extension of the second section, which in turn has a cut at a distance from the other end that is used as an engagement for attaching the first section.

18. Integrated security system for a bicycle according to claim 16, characterized in that the locking device is further securable once inserted in the hole.

* * * * *